US012610426B2

(12) United States Patent
Jiang

(10) Patent No.: US 12,610,426 B2
(45) Date of Patent: Apr. 21, 2026

(54) DISCONTINUOUS TRANSMISSION METHOD, SIGNAL SENDING AND PROCESSING METHOD, AND RELATED DEVICE

(71) Applicant: VIVO MOBILE COMMUNICATION CO., LTD., Guangdong (CN)

(72) Inventor: Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 459 days.

(21) Appl. No.: 18/163,348

(22) Filed: Feb. 2, 2023

(65) Prior Publication Data
US 2023/0180346 A1      Jun. 8, 2023

Related U.S. Application Data

(63) Continuation of application No. PCT/CN2021/111501, filed on Aug. 9, 2021.

(30) Foreign Application Priority Data

Aug. 10, 2020    (CN) .......................... 202010798026.0

(51) Int. Cl.
*H04W 76/28*        (2018.01)
*H04W 52/02*        (2009.01)
(52) U.S. Cl.
CPC ....... *H04W 76/28* (2018.02); *H04W 52/0229* (2013.01)

(58) Field of Classification Search
CPC ............. H04W 76/28; H04W 52/0229; H04W 52/0206; H04W 52/0216; H04W 52/0248; H04W 52/0235; Y02D 30/70
See application file for complete search history.

(56) References Cited

U.S. PATENT DOCUMENTS

| | | | |
|---|---|---|---|
| 9,888,337 B1 | 2/2018 | Zalewski et al. | |
| 2008/0309490 A1 | 12/2008 | Honkanen et al. | |
| 2009/0146785 A1 | 6/2009 | Forster | |
| 2010/0188211 A1 | 7/2010 | Brommer et al. | |
| 2015/0117286 A1* | 4/2015 | Kim .................. | H04W 52/0216 370/311 |
| 2017/0171907 A1 | 6/2017 | Agarwal et al. | |

(Continued)

FOREIGN PATENT DOCUMENTS

| | | |
|---|---|---|
| CN | 101263732 A | 9/2008 |
| CN | 101939757 A | 1/2011 |

(Continued)

OTHER PUBLICATIONS

IEEE Internet of Things Journal, "Passive Relaying Game for Wireless Powered Internet of Things in Backscatter-Aided Hybrid Radio Networks", Jing Xu et al., vol. 6, No. 5, Oct. 2019.

(Continued)

*Primary Examiner* — Marcos L Torres
(74) *Attorney, Agent, or Firm* — Price Heneveld LLP

(57) ABSTRACT
This application discloses a discontinuous transmission method, a signal sending and processing method, and a related device. The method includes: sending, by a first device, a first signal based on a target discontinuous transmission DTX configuration, where the first signal is used for energy collection by a second device.

18 Claims, 5 Drawing Sheets

(56)                     References Cited

U.S. PATENT DOCUMENTS

| | | | | |
|---|---|---|---|---|
| 2018/0049126 A1* | 2/2018 | Cheng | ................... | H04W 76/28 |
| 2023/0062341 A1* | 3/2023 | Zhou | ..................... | H04W 76/15 |
| 2023/0073497 A1* | 3/2023 | Yi | ......................... | H04W 72/23 |

FOREIGN PATENT DOCUMENTS

| | | | |
|---|---|---|---|
| CN | 104853416 A | 8/2015 |
| CN | 109951200 A | 6/2019 |
| CN | 110635826 A | 12/2019 |
| JP | 2019535152 A | 12/2019 |

OTHER PUBLICATIONS

Huawei, Hisilicon, "Evaluation results of UE power saving", 3GPP TSG RAN WG1 Meeting #96, R1-1901571, Feb. 25-Mar. 1, 2019, Athens, Greece.

Interdigital, Inc., "PDCCH-based Power Saving Signal Design", 3GPP TSG RAN WG1 #98bis, R1-1910911, Oct. 14-20, 2019, Chongqing, China.

Xiaomi Communications, "Simulations on PDCCH-WUS not applying to the DRX short cycles", 3GPP TSG-RAN2# 107bis, R2-1912910, Oct. 14-18, 2019, Chongqing, China.

Huawei, Vodafone, "Consideration on UE group wake up signal (WUS)", 3GPP TSG-RAN WG3 Meeting#107bis-e, R3-201676, Apr. 20-30, 2020, E-Meeting.

Ericsson, Long Network DTX in NR, Discussion, Decision, 3GPP TSG-RAN WG2 #95bis, Tdoc R2-166788, Oct. 10-14, 2016, Kaohsiung, Taiwan.

* cited by examiner

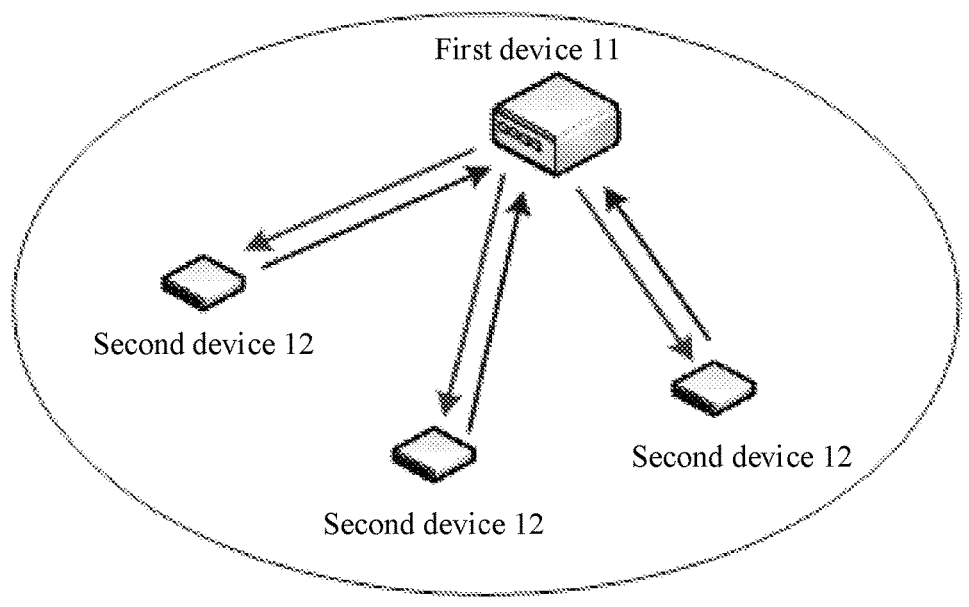
FIG. 1
A first device sends a first signal based on a target
discontinuous transmission configuration, where the first signal
is used for energy collection by a second device                    201
FIG. 2
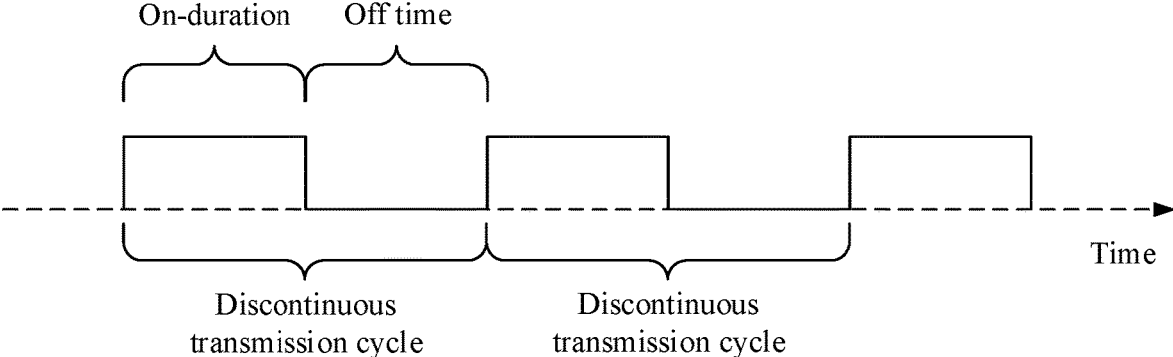
FIG. 3

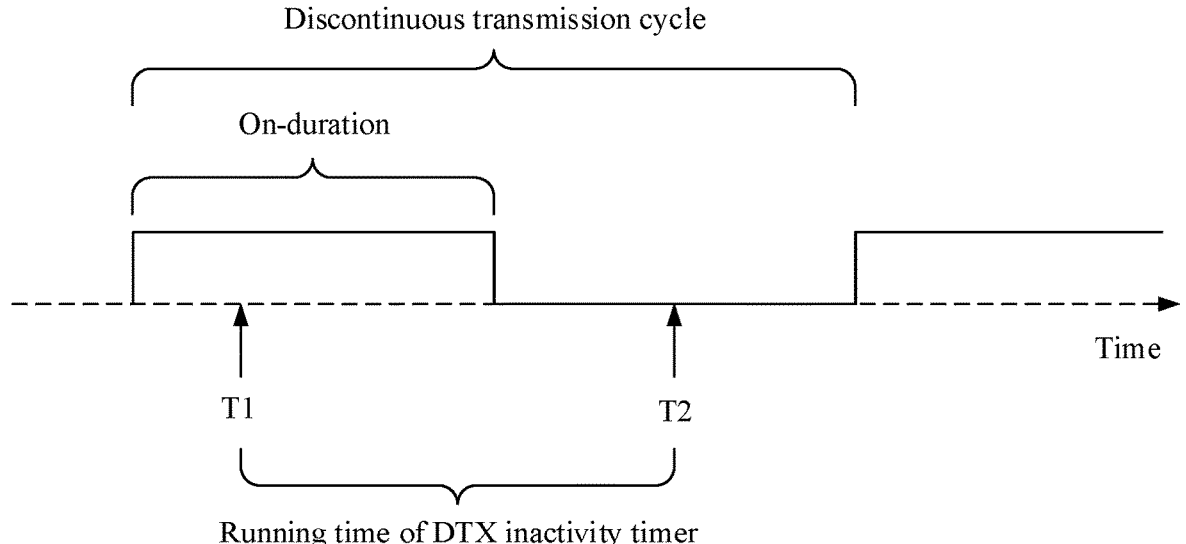
FIG. 4
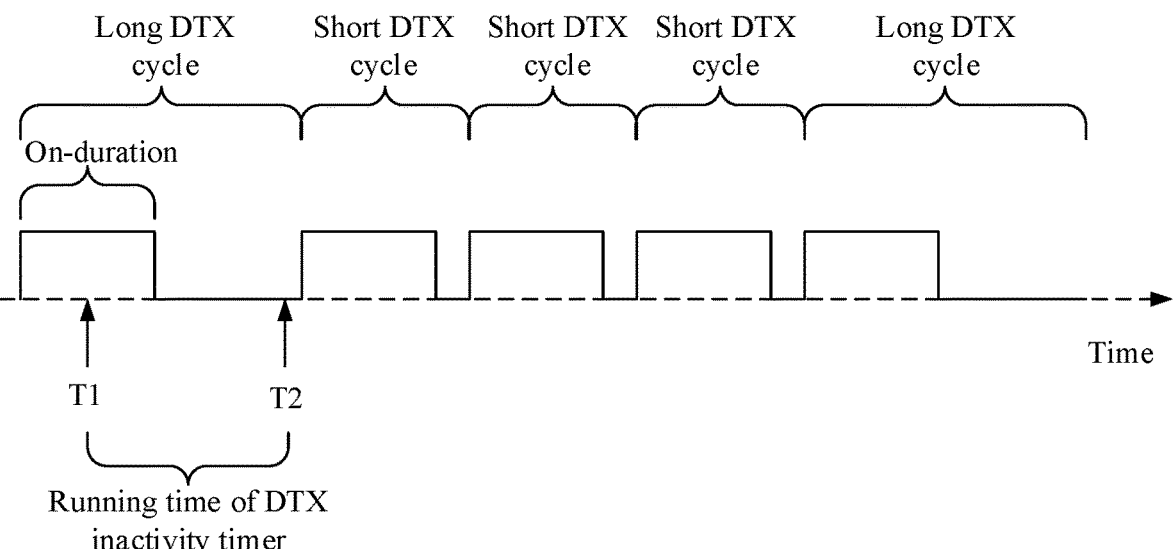
FIG. 5
A second device obtains, based on a target discontinuous transmission DTX configuration of a first device, energy from a first signal sent by the first device
601
FIG. 6

DISCONTINUOUS TRANSMISSION METHOD, SIGNAL SENDING AND PROCESSING METHOD, AND RELATED DEVICE

CROSS-REFERENCE TO RELATED APPLICATIONS

The present application is a bypass continuation application of International Application No. PCT/CN2021/111501 filed on Aug. 9, 2021, which claims priority to Chinese Patent Application No. 202010798026.0, filed in China on Aug. 10, 2020, which are incorporated herein by reference in their entireties.

TECHNICAL FIELD

This application pertains to the field of communications technologies, and in particular, relates to a discontinuous transmission method, a signal sending and processing method, and a related device.

BACKGROUND

Backscatter, as a passive communication technology, allows devices to complete signal transmission under passive conditions by changing characteristics of received ambient radio frequency signals, such as phase or amplitude information, so as to implement information transmission at extremely low power or zero power. In a backscatter system, a reader device usually sends a signal to a backscatter device, and the backscatter device obtains energy from the signal to send its own information. However, the reader device needs to continuously send signals to provide energy for the backscatter device, and therefore the reader device consumes relatively large power.

SUMMARY

Embodiments of this application provide a discontinuous transmission method, a signal sending and processing method, and a related device.

According to a first aspect, a discontinuous transmission method is provided, including:

sending, by a first device, a first signal based on a target discontinuous transmission DTX configuration, where the first signal is used for energy collection by a second device.

According to a second aspect, a signal sending and processing method is provided, including:

obtaining, by a second device based on a target discontinuous transmission DTX configuration of a first device, energy from a first signal sent by the first device.

According to a third aspect, a discontinuous transmission apparatus is provided, including:

a first sending module, configured to send a first signal based on a target discontinuous transmission DTX configuration, where the first signal is used for energy collection by a second device.

According to a fourth aspect, a signal sending and processing apparatus is provided, including:

an obtaining module, configured to obtain, based on a target discontinuous transmission DTX configuration of a first device, energy from a first signal sent by the first device.

According to a fifth aspect, a communications device is provided, where the communications device includes a processor, a memory, and a program or instructions stored in the memory and capable of running on the processor, and when the program or the instructions are executed by the processor, the steps of the method according to the first aspect are implemented, or the steps of the method according to the second aspect are implemented.

According to a sixth aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to a seventh aspect, an embodiment of this application provides a chip, where the chip includes a processor and a communications interface, the communications interface is coupled to the processor, and the processor is configured to run a program or instructions of a network device to implement the method according to the first aspect.

BRIEF DESCRIPTION OF DRAWINGS

FIG. 1 is a structural diagram of a network system to which the embodiments of this application are applicable:

FIG. 2 is a flowchart of a discontinuous transmission method according to an embodiment of this application:

FIG. 3 is an example diagram of a DTX cycle according to an embodiment of this application:

FIG. 4 is a first example diagram of a discontinuous transmission method according to an embodiment of this application:

FIG. 5 is a second example diagram of a discontinuous transmission method according to an embodiment of this application:

FIG. 6 is a flowchart of a signal sending and processing method according to an embodiment of this application:

DETAILED DESCRIPTION OF EMBODIMENTS

Figure 7:
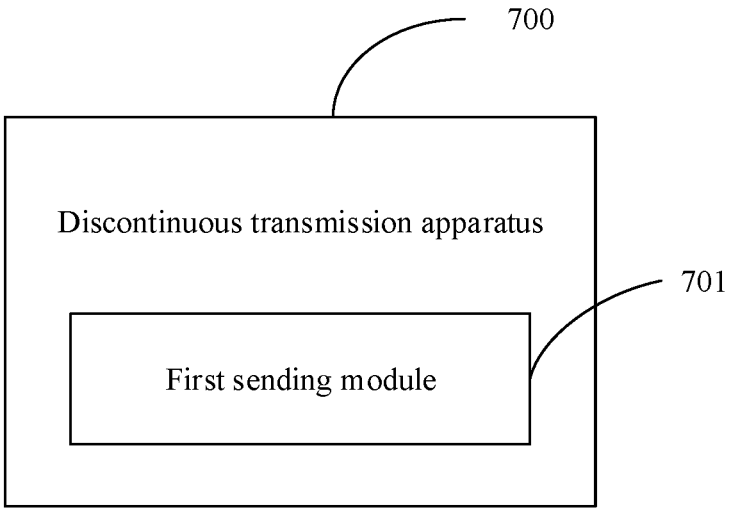
FIG. 7 is a structural diagram of a discontinuous transmission apparatus according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition. "and/or" in this specification and claims indicates at least one of connected objects, and the symbol "/" generally indicates that the associated objects are in an "or" relationship.

It should be noted that technologies described in the embodiments of this application are not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

FIG. 1 is a block diagram of a wireless communications system to which the embodiments of this application are applicable. The wireless communications system includes a first device 11 and a second device 12. The first device may be a reader device, and the second device may be a backscatter device. The reader device may be a terminal or a network device, and the terminal may also be referred to as terminal device or a user terminal (User Equipment. UE). The terminal may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal is not limited in the embodiments of this application. The network device may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

For ease of understanding, the following describes some content included in the embodiments of this application:

connected discontinuous reception (CDRX) in LTE and new radio (NR).

A DRX mechanism is introduced to both LTE and NR, and DRX on and off durations are configured to implement power saving for UEs. An onduration is a DRX on time, and if no scheduling is performed during the onduration time, the UE enters an off time of a DRX cycle. During configuring of DRX, parameters such as onDurationTimer, drx-Inactivity Timer, drx-RetransmissionTimer, and longDRX-Cycle-StartOffset are usually configured.

After DRX is configured for the UE, if decoding of transmitted or received data fails, the UE needs to enter an active time to monitor a control channel and wait for retransmission scheduled by the network.

During the onduration time, if the UE is scheduled in a slot and receives data, it is likely to continue to be scheduled in next several slots. Therefore, a timer drx-Inactivity Timer is started or restarted whenever the UE is scheduled to perform initial data transmission, and the UE remains in an active state until the timer expires.

For downlink data reception, after receiving downlink data transmission indicated by a physical downlink control channel (PDCCH) and feeding back the hybrid automatic repeat request (HARQ) information, the UE starts a downlink round trip time timer (HARQ RTT (Round Trip Time) Timer) for a corresponding HARQ process. If the HARQ RTT timer expires and data of the HARQ process is not successfully decoded, the UE starts a retransmission timer (drx-RetransmissionTimer), monitors the PDCCH, and waits for transmission.

For uplink data transmission, after receiving uplink data transmission that is indicated by the PDCCH, the UE starts an uplink round trip time timer HARQ RTT Timer for the corresponding HARQ process. After the HARQ RTT timer expires, the UE starts a retransmission timer (drx-RetransmissionTimerUL), enters the active state to monitor the PDCCH, and waits for transmission scheduled by the network.

The following describes in detail a discontinuous transmission method provided in the embodiments of this application by using specific embodiments and application scenarios thereof with reference to the accompanying drawings.

Referring to FIG. 2, FIG. 2 is a flowchart of a discontinuous transmission method according to an embodiment of this application. The method is applied to a first device, and as shown in FIG. 2, includes the following steps.

Step 201: The first device sends a first signal based on a target discontinuous transmission (DTX) configuration, where the first signal is used for energy collection by a second device.

The first device may be understood as a reader device, and provides energy to the second device by sending the first signal. Optionally, the first device may alternatively read a second signal sent by the second device. For example, in an embodiment, the first device may be a mobile phone, a dedicated device, a base station, or the like. The dedicated device may be understood as a device from which the second device collects energy, such as a power bank capable of sending signals. The second device may be understood as a backscatter device or a tag device, and can collect energy from signals provided by the first device. Optionally, the second device can also use the collected energy to send a second signal. For example, the second device may be a device such as smart glasses, and the first device is a mobile phone. The smart glasses collect energy from signals sent by the mobile phone, and send a second signal to the mobile phone.

Alternatively, the first device is a base station or a signal source, and the second device is a related device such as a large intelligent surface (LIS) or an intelligent reflecting surface (IRS) associated with the base station or the signal source. The base station or the signal source provides energy for the LIS or IRS or the like by sending a first signal, and the devices such as the LIS or IRS send a second signal using the collected energy of the base station or the signal source.

It should be understood that a signal transmitted between the first device and the second device is a radio frequency signal, an electromagnetic wave signal, an optical signal, or other signals that can provide energy.

In this embodiment of this application, the first device sends the first signal discontinuously based on the target DTX configuration, and the second device obtains, based on the target DTX configuration, the energy of the first signal sent by the first device, and completes sending of its own signal based on the obtained energy.

In the embodiments of this application, the first device sends the first signal based on the target DTX configuration, where the first signal is used for energy collection by the second device. In this way, the first device is able to send the first signal discontinuously, thereby reducing power consumption of the first device.

In an embodiment, the target DTX configuration includes a value of at least one of the following parameters:

long DTX cycle:

long DTX cycle and time offset;

DTX on-duration (DTX_onDurationTimer);

DTX inactivity timer (DTX_inactivitytimer);

short DTX cycle; and short DTX cycle timer: where the long DTX cycle is M times the short DTX cycle, and M is an integer greater than 1.

In this embodiment of this application, the target DTX configuration may be a DTX configuration specified by a protocol, or may be a DTX configuration indicated by a network device or the second device, which is not further limited herein.

Optionally, in an embodiment, the long DTX cycle or the short DTX cycle includes a DTX on-duration and a DTX off time, and the step of sending, by a first device, a first signal based on a target discontinuous transmission DTX configuration includes:

sending, by the first device, the first signal during the DTX on-duration; and skipping, by the first device, sending the first signal during the DTX off time: or in a case that the first device does not receive a second signal sent by the second device during the DTX on-duration, entering, by the first device, the DTX off time after the DTX on-duration elapses, and skipping, by the first device, sending the first signal during the DTX off time.

As shown in FIG. 3, generally, one DTX cycle includes a DTX on-duration and a DTX off time.

The DTX on-duration may be understood as duration of the DTX cycle, which may also be referred to as a DTX on interval; and the DTX off time may be understood as an off time of the DTX cycle, which may also be referred to as a DTX off interval.

In this embodiment of this application, one DTX cycle includes two parts: the DTX on-duration and the DTX off time. During the DTX on-duration, the first device may send the first signal, and the second device may use energy of the first signal. If the first device does not receive a second signal from the second device during the DTX on-duration, the first device enters the DTX off time after the DTX on-duration elapses, and the first device does not transmit a first signal during the DTX off time.

It should be understood that the second signal being received by the first device may be understood as: the first device demodulates information carried in the second signal sent by the second device, or energy of the received second signal sent by the second device is higher than a preset threshold. Correspondingly, when the foregoing condition is not satisfied, it can be understood that the first device has not received the second signal sent by the second device.

Optionally, before the step of sending, by a first device, a first signal based on a target discontinuous transmission DTX configuration, the method further includes:

receiving, by the first device, first indication information sent by the second device or a network device: where the first indication information is used to indicate the target DTX configuration: or the first indication information is used to indicate one of at least two DTX configurations being the target DTX configuration.

In this embodiment of this application, the first indication information being used to indicate the target DTX configuration can be understood as the first indication information indicating values of parameters in the target DTX configuration. Because the second device or the network device can flexibly indicate the values of the parameters in the target DTX configuration, flexibility of control using the target DTX configuration can be improved. The first indication information is used to indicate that one of the at least two DTX configurations is the target DTX configuration. It can be understood that the first indication information indicates identification information of one DTX configuration. For example, indexes of the at least two DTX configurations or an index of each DTX configuration may be pre-configured or specified by a protocol. The first indication information indicates an index of one DTX configuration, and the first device may determine the target DTX configuration based on the index indicated by the first indication information. Because an index is used to indicate a DTX configuration, overheads of the first indication information can be reduced and resources can be saved.

It should be understood that, in this embodiment of this application, each DTX configuration can be understood as a transmission mode, where values of parameters of one or more DTX configurations may be different between different transmission modes. The foregoing at least two DTX configurations may be sent by the network device or the second device, which is not further limited herein.

Optionally, in an embodiment, in a case that the target DTX configuration includes a value of a DTX inactivity time, the step of sending, by a first device, a first signal based on a target discontinuous transmission DTX configuration includes:

starting, by the first device, the DTX inactivity timer in a case that the first device receives a second signal sent by the second device;

sending the first signal based on a first DTX cycle in a case that the DTX inactivity timer does not expire; and sending the first signal based on a second DTX cycle in a case that the DTX inactivity timer expires.

In this embodiment of this application, the DTX inactivity timer may be referred to as DTX_inactivitytimer, which may be equivalent to DRX_inactivitytimer of CDRX. For example, the DTX inactivity timer may perform timing in a countdown manner. For example, in a case that the DTX inactivity timer has been started and the first device receives no second signal sent by the second device in a slot, the DTX inactivity timer is decremented, that is, the timer is decremented by 1.

As shown in FIG. 4, at a time point T1, the first device receives the second signal sent by the second device, and the first device starts the DTX inactivity timer on a subsequent slot. From the time point T1 until a time point T2, the first device no longer receives a second signal sent by the second device, and therefore the DTX inactivity timer expires at the time point T2. After the DTX inactivity timer expires, it is within an off time of the DTX cycle at that time, and therefore the first device does not send a first signal.

Time lengths of the first DTX cycle and the second DTX cycle can be set according to actual needs. For example, in an embodiment, the first DTX cycle is less than the second DTX cycle, that is, the time length of the first DTX cycle is less than the time length of the second DTX cycle. Because the first DTX cycle is set to be less than the second DTX cycle, in a case that the DTX inactivity timer has not expired, it indicates that the second device may need to continue sending the second signal within a period of time after the DTX inactivity timer is triggered. In this case, the first signal is sent based on the first DTX cycle, so that a cycle for sending the first signal can be shortened, which facilitates faster energy collection of the second device from the first signal, thereby reducing a delay of sending the second signal by the second device. In a case that the DTX inactivity timer expires, it indicates that sending of the second signal may have been completed, and in this case, the first signal is sent based on the second DTX cycle, so as to further reduce power consumption of the first device.

Further, after the starting, by the first device, the DTX inactivity timer in a case that the first device receives a second signal sent by the second device, the method further includes:

in a case that the first device receives again, before the DTX inactivity timer expires, a second signal sent by the second device, restarting, by the first device, the DTX inactivity timer.

In this embodiment, before the DTX inactivity timer expires, the first device restarts the DTX inactivity timer each time the second signal is received. This can ensure that the delay of sending the second signal by the second device is reduced when the second device sends the second signal multiple times within a period of time.

For example, the reader device works in a first preset transmission mode (for example, cycle 1). If the reader device receives a second signal sent by a tag device, a timer (DTX_inactivitytimer) is started and counts down. Before the timer expires, the reader device sends a first signal based on a second preset transmission mode. In a case that the timer expires, the reader device switches to another preset transmission mode or the first preset transmission mode.

Before the timer expires, if the reader device receives a signal sent by the tag again, the timer is restarted. The second preset transmission mode can be understood as a transmission mode corresponding to a cycle smaller than the cycle 1, or a transmission mode of continuously sending signals for the tag to collect energy.

Optionally, the step of sending, by a first device, a first signal based on a target discontinuous transmission DTX configuration includes:

in a case that a DTX inactivity timer of the long DTX cycle of the first device is started and expires, sending, by the first device, the first signal based on the short DTX cycle; and in a case that DTX inactivity timers of N short DTX cycles are not started in the N consecutive short DTX cycles, sending, by the first device, the first signal based on the long DTX cycle, where N is a positive integer.

For example, in this embodiment, as shown below; the first device supports the short DTX function, and after the DTX_inactivitytimer is started when the first device works in the long DTX cycle, the first complete DTX cycle is a short DTX cycle. If DTX_inactivitytimer is not started during N (short DTX cycle timers) consecutive short DTX cycles (as shown in FIG. 5, N=3), the long DTX cycle enters after the N short DTX cycles.

In another embodiment, the target DTX configuration includes values of the following parameters:

DTX cycle; and time position at which the first signal needs to be sent in the DTX cycle.

For example, the DTX cycle is 10 slots, or 10 ms. A time position at which the first signal needs to be sent in the DTX cycle is the first slot and the third slot.

In an embodiment, for DTX configurations being set based on a search space, the network device or the second device may alternatively configure a plurality of types of DTX configurations for the terminal, so as to implement switching between the DTX configurations according to specific rules. Each type of DTX configuration may be understood as one DTX configuration, or may be understood as a transmission mode, where values of one or more DTX configuration parameters may be different between different transmission modes.

Optionally, before the step of sending, by a first device, a first signal based on a target discontinuous transmission DTX configuration, the method further includes at least one of the following:

determining, by the first device, the target DTX configuration based on received second indication information sent by the second device or a network device;

in a case that a second signal sent by the second device is received, determining, by the first device, a first preset DTX configuration as the target DTX configuration; and in a case that the second signal sent by the second device is not received within a preset time period, determining, by the first device, a second preset DTX configuration as the target DTX configuration.

In this embodiment of this application, the second indication information may be sent by using dedicated signaling. The first preset DTX configuration may be understood as a pre-specified DTX configuration, or may be understood as a DTX configuration corresponding to the second signal. For example, the target DTX configuration may be determined based on a characteristic or mode of the second signal. Determining the first preset DTX configuration as the target DTX configuration can be understood as: activating the first preset DTX configuration.

Optionally, in an embodiment, in the case that the second signal sent by the second device is received, the first preset DTX configuration is determined as the target DTX configuration at a target time point, and the target time point is N time units after the second signal is received.

In this embodiment, the time unit may be slot, symbol, or millisecond, and the value of N may be specified by the protocol or configured by the network device, which is not further limited herein.

For example, a switching method between DTX patterns is as follows:

1. Dedicated signaling indicates a DTX pattern. For example, the tag device or the base station directly indicates the reader device to use the target DTX pattern.

Optionally, the values of the parameters of the target DTX pattern may be indicated.

Optionally, a transmit power value may alternatively be further indicated to the reader device, or increasing or decreasing a step of the transmit power may be indicated to the reader device.

Optionally, a plurality of DTX patterns may be configured or agreed in advance, and then one DTX patterns is indicated.

Optionally, the reader device sends the signal based on a DTX pattern indicated by signaling.

2. A target signal/signaling is received, so as to activate a DTX pattern.

For example, the reader device receives a target signal/signaling from the tag (for example, receiving the target signal from the tag device on a same carrier frequency of the first signal of the reader device, where, for example, energy monitoring is performed (a preset threshold is reached) to determine that the tag device is sending the target signal), so as to activate/switch to a DTX pattern.

Optionally, the DTX pattern is configured in advance, or the DTX pattern is determined based on a signal characteristic/pattern of the detected signal of the tag.

The activation time is the Nth symbol, slot, or millisecond after the reader device receives the target signal/signaling. Optionally, the value of N may be specified by the protocol or configured by the network.

3. If the signal of the tag is not received within a specific timer (meaning that the tag has no communication requirements), that is, the timer expires, the reader falls back to a predetermined pattern; and if the signal of the tag is received before the timer expires, the timer is restarted.

In another embodiment, the method further includes:

receiving, by the first device, third indication information sent by the second device or a network device, where the third indication information is used to indicate not sending the first signal within a target duration.

In this embodiment of this application, the network device or the second device may dynamically indicate, by using signaling, the first device to not send a signal for a subsequent period of time (x ms or x slots), and the first device may send or may not send the first signal according to the signaling indication.

It should be noted that the second device may have two application scenarios: with an active transmitter and without an active transmitter. For different application scenarios, the second device may indicate information to the first device in different manners, which is described in detail below:

Scenario 1: The second device has an active transmitter and a backscatter transmitter. The transmission mode includes:

The second device sends a signal using the active transmitter (sending in a non-backscatter manner) to notify the first device of a DTX configuration desired by the second device, so that the second device can capture energy for signal transmission.

Scenario 2: The second device has only a backscatter transmitter. The transmission mode includes:

1. The first device sends a periodic signal (for example, DTX pattern 1).

2. The second device uses energy of the signal to send a signal to the first device, to notify the first device of a DTX pattern 2 desired by the second device.

Optionally, one first device may be associated with one or more second devices, and provide the first signal for the plurality of second devices, so that the associated second devices can obtain energy from the first signal. Specifically, when one first device is associated with a plurality of second devices, the first device may maintain one DTX configuration for each associated second device, and the first device determines, at each time point based on superimposing effects of a plurality of DTX configurations, a DTX configuration to be finally used.

Referring to FIG. 6, FIG. 6 is a flowchart of a signal sending and processing method according to an embodiment of this application. The method is applied to a terminal, and as shown in FIG. 6, includes the following steps.

Step 601: A second device obtains, based on a target discontinuous transmission DTX configuration of a first device, energy from a first signal sent by the first device.

Optionally, the method further includes:

sending, by the second device, a second signal using the obtained energy.

Optionally, the target DTX configuration includes a value of at least one of the following parameters:

long DTX cycle;

long DTX cycle and time offset;

DTX on-duration;

DTX inactivity timer;

short DTX cycle; and short DTX cycle timer: where the long DTX cycle is M times the short DTX cycle, and M is an integer greater than 1.

Optionally, the step of obtaining, by a second device based on a target discontinuous transmission DTX configuration of a first device, energy from a first signal sent by the first device includes:

obtaining, by the second device during the DTX on-duration, energy from the first signal sent by the first device.

Optionally, before the step of obtaining, by a second device based on a target discontinuous transmission DTX configuration of a first device, energy from a first signal sent by the first device, the method further includes:

sending, by the second device, first indication information, where the first indication information is used to indicate the target DTX configuration; or the first indication information is used to indicate one of at least two DTX configurations being the target DTX configuration.

Optionally, in a case that the target DTX configuration includes a value of a DTX inactivity time, the step of obtaining, by a second device based on a target discontinuous transmission DTX configuration of a first device, energy from a first signal sent by the first device includes:

starting, by the second device, the DTX inactivity timer in a case that the second device sends the second signal;

in a case that the DTX inactivity timer does not expire, obtaining, based on a first DTX cycle, energy from the first signal sent by the first device; and in a case that the DTX inactivity timer expires, obtaining, based on a second DTX cycle, energy from the first signal sent by the first device.

Optionally, after the step of starting, by the second device, the DTX inactivity timer in a case that the second device sends the second signal, the method further includes:

in a case that the second device sends a second signal again before the DTX inactivity timer expires, restarting, by the second device, the DTX inactivity timer.

Optionally, the step of obtaining, by a second device based on a target discontinuous transmission DTX configuration of a first device, energy from a first signal sent by the first device includes:

in a case that a DTX inactivity timer of the long DTX cycle of the first device is started and expires, obtaining, by the second device based on the short DTX cycle, energy from the first signal sent by the first device; and in a case that DTX inactivity timers of N short DTX cycles are not started in the N consecutive short DTX cycles, obtain, based on the long DTX cycle, energy from the first signal sent by the first device, where N is a positive integer.

Optionally, the target DTX configuration includes values of the following parameters:

DTX cycle; and time position at which the first signal needs to be sent by the first device in the DTX cycle.

Optionally, before the step of obtaining, by a second device based on a target discontinuous transmission DTX configuration of a first device, energy from a first signal sent by the first device, the method further includes:

determining, by the second device, the target DTX configuration based on second indication information sent by the second device;

in a case that a second signal is sent by the second device, determining, by the second device, a first preset DTX configuration as the target DTX configuration; and in a case that the second signal is not sent within a preset time period, determining, by the second device, a second preset DTX configuration as the target DTX configuration.

Optionally, in the case that the second signal is sent by the second device, the first preset DTX configuration is determined as the target DTX configuration at a target time point, and the target time point is N time units after the second signal is sent.

Optionally, the method further includes:

sending, by the second device, third indication information to the first device, where the third indication information is used to indicate not sending the first signal within a target duration.

It should be noted that this embodiment is used as an implementation of the second device corresponding to the embodiment shown in FIG. 2. For specific implementations of this embodiment, reference may be made to the related descriptions of the embodiment shown in FIG. 2, and same beneficial effects are achieved. To avoid repetition, details are not described herein again.

It should be noted that, in the discontinuous transmission method provided by the embodiments of this application, the execution body may be a discontinuous transmission apparatus, or a control module for executing the discontinuous transmission method in the discontinuous transmission apparatus. In the embodiments of this application, the discontinuous transmission method provided by the embodiments of this application is described by using the discontinuous transmission method being performed by the discontinuous transmission apparatus as an example.

Referring to FIG. 7, FIG. 7 is a structural diagram of a discontinuous transmission apparatus according to an embodiment of this application. As shown in FIG. 7, the discontinuous transmission apparatus 700 includes:

a first sending module 701, configured to send a first signal based on a target discontinuous transmission DTX configuration, where the first signal is used for energy collection by a second device.

Optionally, the target DTX configuration includes a value of at least one of the following parameters:

long DTX cycle;

long DTX cycle and time offset;

DTX on-duration;

DTX inactivity timer;

short DTX cycle; and short DTX cycle timer: where the long DTX cycle is M times the short DTX cycle, and M is an integer greater than 1.

Optionally, the long DTX cycle or the short DTX cycle includes a DTX on-duration and a DTX off time. The first sending module 701 is specifically configured to:

send, for the first device, the first signal during the DTX on-duration; and skip, for the first device, sending the first signal during the DTX off time: or in a case that the first device does not receive a second signal sent by the second device during the DTX on-duration, enter, for the first device, the DTX off time after the DTX on-duration elapses, and skip, for the first device, sending the first signal during the DTX off time.

Optionally, the discontinuous transmission apparatus 700 further includes:

a receiving module, configured to receive first indication information sent by the second device or a network device: where the first indication information is used to indicate the target DTX configuration: or the first indication information is used to indicate one of at least two DTX configurations being the target DTX configuration.

Optionally, in a case that the target DTX configuration includes a value of a DTX inactivity time, the first sending module 701 includes:

a first starting unit, configured to start the DTX inactivity timer in a case that the first device receives a second signal sent by the second device; and a sending unit, configured to send the first signal based on a first DTX cycle in a case that the DTX inactivity timer does not expire: or send the first signal based on a second DTX cycle in a case that the DTX inactivity timer expires.

Optionally, in a case that the first device receives a second signal sent by the second device, the first starting unit is further configured to: in a case that the first device receives again, before the DTX inactivity timer expires, a second signal sent by the second device, restart the DTX inactivity timer.

Optionally, the first sending module 701 is specifically configured to:

in a case that a DTX inactivity timer of the long DTX cycle of the first device is started and expires, send, for the first device, the first signal based on the short DTX cycle; and in a case that DTX inactivity timers of N short DTX cycles are not started in the N consecutive short DTX cycles, send, for the first device, the first signal based on the long DTX cycle, where N is a positive integer.

Optionally, the target DTX configuration includes values of the following parameters:

DTX cycle; and time position at which the first signal needs to be sent in the DTX cycle.

Optionally, the discontinuous transmission apparatus 700 further includes a first determining module, configured to perform at least one of the following:

determining, for the first device, the target DTX configuration based on received second indication information sent by the second device or a network device;

in a case that a second signal sent by the second device is received, determining, for the first device, a first preset DTX configuration as the target DTX configuration; and in a case that the second signal sent by the second device is not received within a preset time period, determining, for the first device, a second preset DTX configuration as the target DTX configuration.

Optionally; the first determining module is specifically configured to: in the case that the second signal sent by the second device is received, determine the first preset DTX configuration as the target DTX configuration at a target time point, where the target time point is N time units after the second signal is received.

Optionally, the discontinuous transmission apparatus 700 further includes:

a receiving module, configured to receive third indication information sent by the second device or a network device, where the third indication information is used to indicate not sending the first signal within a target duration.

The discontinuous transmission apparatus provided in this embodiment of this application can implement the processes implemented in the method embodiment in FIG. 2, with the same technical effects achieved. To avoid repetition, details are not described herein again.

Figure 8:
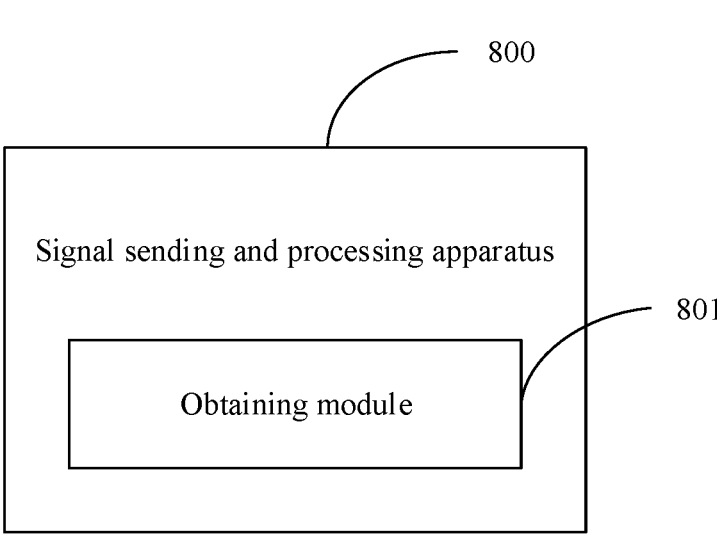
FIG. 8 is a structural diagram of a signal sending and processing apparatus according to an embodiment of this application.

It should be noted that, in the signal sending and processing method provided by the embodiments of this application, the execution body may be a signal sending and processing apparatus, or a control module for executing the signal sending and processing method in the signal sending and processing apparatus. In the embodiments of this application, the signal sending and processing apparatus provided by the embodiments of this application is described by using the signal sending and processing method being executed by the signal sending and processing apparatus as an example. Referring to FIG. 8, FIG. 8 is a structural diagram of a signal sending and processing apparatus according to an embodiment of this application. As shown in FIG. 8, the signal sending and processing apparatus 800 includes:

an obtaining module 801, configured to obtain, based on a target discontinuous transmission DTX configuration of a first device, energy from a first signal sent by the first device.

Optionally; the signal sending and processing apparatus 800 further includes:

a second sending module, configured to send a second signal using the obtained energy.

Optionally, the target DTX configuration includes a value of at least one of the following parameters:

long DTX cycle;

long DTX cycle and time offset;

DTX on-duration;

DTX inactivity timer;

short DTX cycle; and short DTX cycle timer; where the long DTX cycle is M times the short DTX cycle, and M is an integer greater than 1.

Optionally, the obtaining module 801 is specifically configured to:

obtain, for the second device during the DTX on-duration, energy from the first signal sent by the first device.

Optionally, the second sending module is further configured to send first indication information, where the first indication information is used to indicate the target DTX configuration; or the first indication information is used to indicate one of at least two DTX configurations being the target DTX configuration.

Optionally, in a case that the target DTX configuration includes a value of a DTX inactivity time, the obtaining module 801 includes:

a second starting unit, configured to start the DTX inactivity timer in a case that the second device sends the second signal; and an obtaining unit, configured to: in a case that the DTX inactivity timer does not expire, obtain, based on a first DTX cycle, energy from the first signal sent by the first device; or in a case that the DTX inactivity timer expires, obtain, based on a second DTX cycle, energy from the first signal sent by the first device.

Optionally, the second starting unit is further configured to: in a case that the second device sends a second signal again before the DTX inactivity timer expires, restart the DTX inactivity timer.

Optionally, the obtaining module 801 is specifically configured to:

in a case that a DTX inactivity timer of the long DTX cycle of the first device is started and expires, obtain, based on the short DTX cycle, energy from the first signal sent by the first device; and in a case that DTX inactivity timers of N short DTX cycles are not started in the N consecutive short DTX cycles, obtain, based on the long DTX cycle, energy from the first signal sent by the first device, where N is a positive integer.

Optionally, the target DTX configuration includes values of the following parameters:

DTX cycle; and time position at which the first signal needs to be sent by the first device in the DTX cycle.

Optionally, the signal sending and processing apparatus 800 further includes a second determining module, configured to perform at least one of the following:

determining the target DTX configuration based on second indication information that is sent;

in a case that a second signal is sent by the second device, determine, for the second device, a first preset DTX configuration as the target DTX configuration; and in a case that the second signal is not sent within a preset time period, determine, for the second device, a second preset DTX configuration as the target DTX configuration.

Optionally, the second determining module is further configured to: in the case that the second signal is sent by the second device, determine the first preset DTX configuration as the target DTX configuration at a target time point, where the target time point is N time units after the second signal is sent.

Optionally, the second sending module is further configured to send third indication information to the first device, where the third indication information is used to indicate not sending the first signal within a target duration.

The signal sending and processing apparatus provided in this embodiment of this application can implement the processes implemented in the method embodiment in FIG. 6, with the same technical effects achieved. To avoid repetition, details are not described herein again.

The discontinuous transmission apparatus and the signal sending and processing apparatus in the embodiment of this application may be an apparatus, or may be a component, an integrated circuit, or a chip in a terminal. The apparatus may be a mobile terminal or a non-mobile terminal. For example, the mobile terminal may include but is not limited to the types of the terminal listed above, and the non-mobile terminal may be a server, a network attached storage (NAS), a personal computer (PC), a television (TV), a teller machine, a self-service machine, or the like, which is not specifically limited in this embodiment of this application.

The discontinuous transmission apparatus and the signal sending and processing apparatus in the embodiment of this application may be an apparatus with an operating system.

The operating system may be an Android operating system, an iOS operating system, or other possible operating systems, and is not specifically limited in the embodiments of this application.

Figure 9:
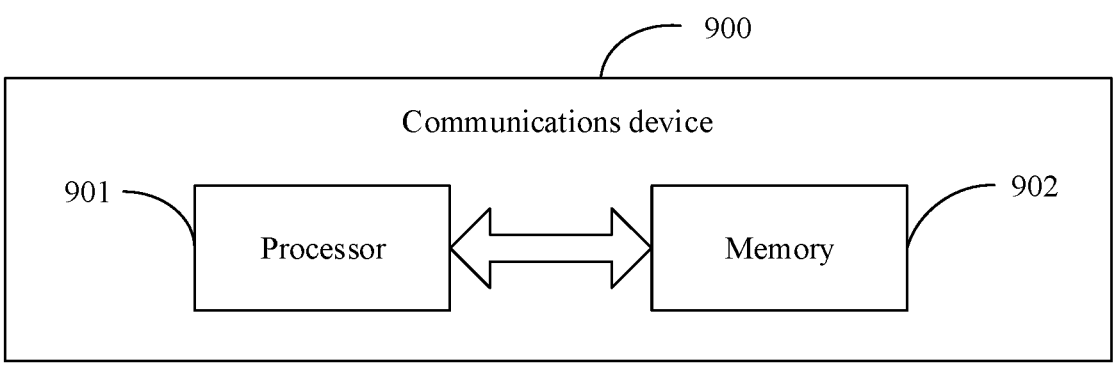
FIG. 9 is a structural diagram of a communications device according to an embodiment of this application.

Optionally, as shown in FIG. 9, an embodiment of this application further provides a communications device 900, including a processor 901, a memory 902, and a program or instructions stored in the memory 902 and capable of running on the processor 901. For example, when the communications device 900 is a terminal and when the program or the instructions are executed by the processor 901, the processes of the foregoing embodiment of the discontinuous transmission method are implemented, with the same technical effects achieved. When the communications device 900 is a network device and when the program or the instructions are executed by the processor 901, the processes of the foregoing embodiment of the discontinuous transmission method or the signal sending and processing method are implemented, with the same technical effects achieved. To avoid repetition, details are not described herein again.

Figure 10:
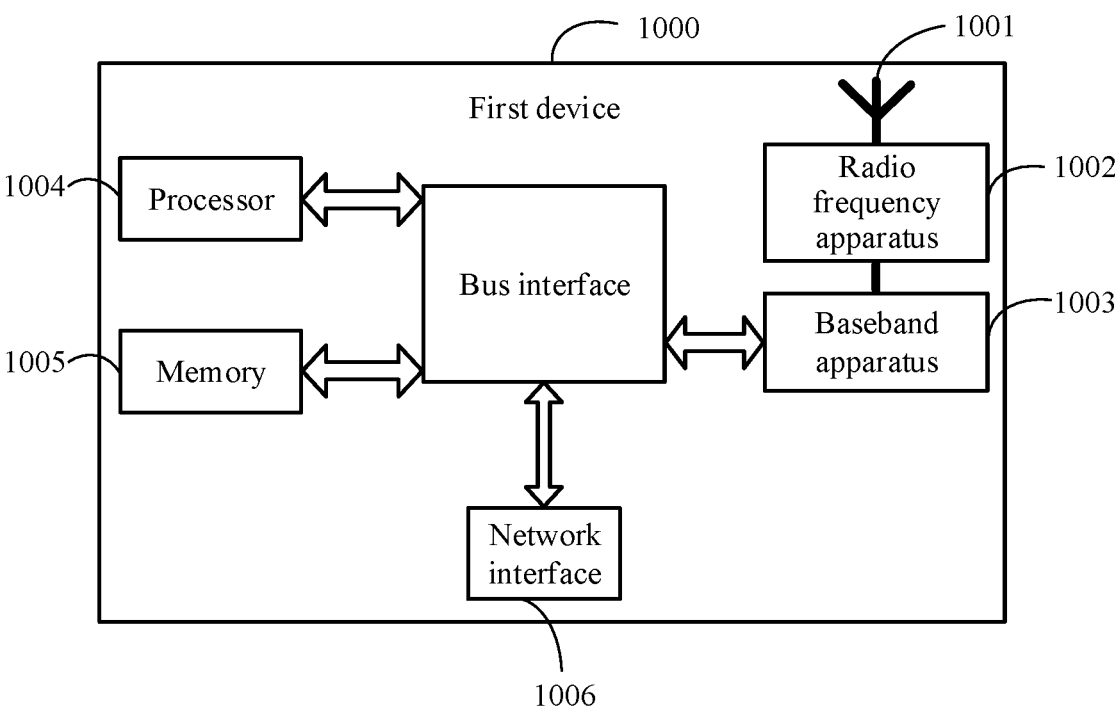
FIG. 10 is a structural diagram of a first device according to an embodiment of this application.

Specifically, an embodiment of this application further provides a first device. As shown in FIG. 10, the first device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes to-be-sent information, and sends the information to the radio frequency apparatus 1002; and the radio frequency apparatus 1002 processes the received information and then sends the information out by using the antenna 1001.

The frequency band processing apparatus may be located in the baseband apparatus 1003. The method performed by the first device in the foregoing embodiment may be implemented in the baseband apparatus 1003, and the baseband apparatus 1003 includes a processor 1004 and a memory 1005.

The baseband apparatus 1003 may include, for example, at least one baseband processing unit, where a plurality of chips are disposed on the baseband processing unit. As shown in FIG. 10, one of the chips is, for example, the processor 1004, connected to the memory 1005, to invoke a program in the memory 1005 to perform the operation of the first device shown in the foregoing method embodiment.

The baseband apparatus 1003 may further include a network interface 1006, configured to exchange information with the radio frequency apparatus 1002, where the interface is, for example, a common public radio interface (CPRI).

Specifically, the first device in this embodiment of this application further includes: instructions or a program stored in the memory 1005 and capable of running on the processor 1004. The processor 1004 invokes the instructions or program in the memory 1005 to execute the method executed by the modules shown in FIG. 7, with the same technical effects achieved. To avoid repetition, details are not repeated herein.

Figure 11:
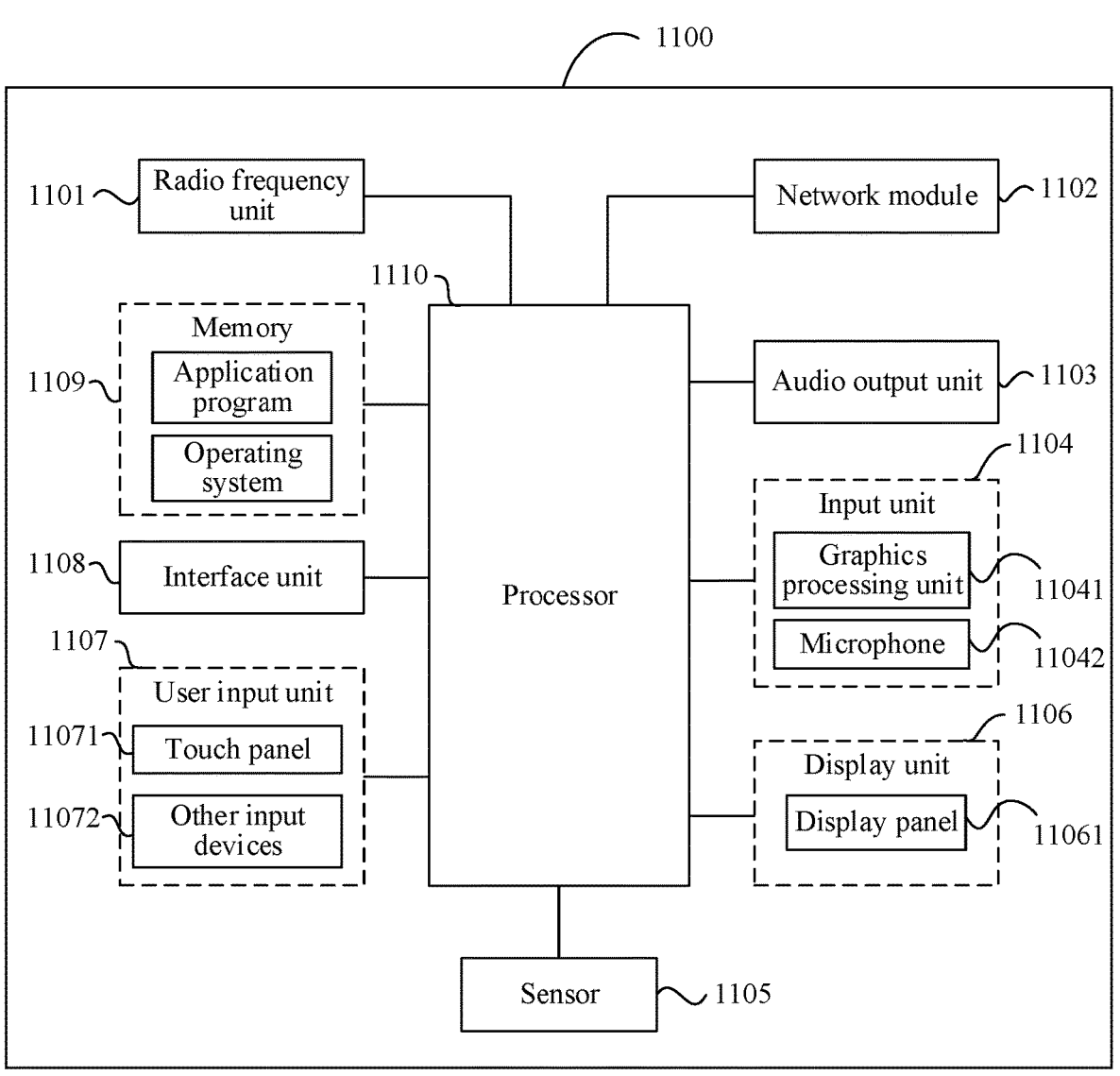
FIG. 11 is a structural diagram of a second device according to an embodiment of this application.

FIG. 11 is a schematic diagram of a hardware structure of a second device for implementing the embodiments of this application.

The second device 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

Persons skilled in the art can understand that the second device 1100 may further include a power supply (for example, a battery) supplying power to the components, and the power supply may be logically connected to the processor 1110 through a power management system. In this way, functions such as charge management, discharge management, and power consumption management are implemented by using the power management system. The structure of the second device shown in FIG. 11 does not constitute any limitation on the second device. The second device may include more or fewer components than shown in the figure, or a combination of some components, or the components disposed differently. Details are not repeated herein.

It can be understood that in this embodiment of this application, the input unit 1104 may include a graphics processing unit (GPU) 11041 and a microphone 11042. The graphics processing unit 11041 processes image data of a still picture or video obtained by an image capture apparatus (such as a camera) in a video capture mode or an image capture mode. The display unit 1106 may include a display panel 11061, and the display panel 11061 may be configured in a form of a liquid crystal display, an organic light-emitting diode, and the like. The user input unit 1107 may include a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a function key (such as a volume control key or a power on/off key), a trackball, a mouse, and a joystick. Details are not described herein.

In this embodiment of this application, the radio frequency unit 1101 receives downlink data from a network device, and then sends the downlink data to the processor 1110 for processing; and also sends uplink data to the network device. Generally, the radio frequency unit 1101 includes but is not limited to an antenna, at least one amplifier, a transceiver, a coupler, a low noise amplifier, a duplexer, and the like.

The memory 1109 may be configured to store software programs or instructions and various data. The memory 1109 may include a program or instruction storage area and a data storage area. The program or instruction storage area may store an operating system, an application program or instructions required by at least one function (for example, a sound playback function or an image playback function), and the like. In addition, the memory 1109 may include a high-speed random access memory, and may further include a non-volatile memory. The non-volatile memory may be a read-only memory (ROM), a programmable read-only memory (programmable ROM, PROM), an erasable programmable read-only memory (erasable PROM. EPROM), an electrically erasable programmable read-only memory (electrically EPROM, EEPROM), or a flash memory, for example, at least one disk storage device, a flash memory device, or another volatile solid-state storage device.

The processor 1110 may include one or more processing units. Optionally, an application processor and a modem processor may be integrated in the processor 1110. The application processor primarily processes an operating system, user interfaces, application programs or instructions, and the like. The modem processor primarily processes radio communication, for example, being a baseband processor. It can be understood that the modem processor may alternatively be not integrated in the processor 1110.

The radio frequency unit 1101 is configured to obtain, based on a target discontinuous transmission DTX configuration of a first device, energy from a first signal sent by the first device.

It should be understood that in this embodiment, the processor 1110 and the radio frequency unit 1101 is capable of implementing the processes implemented by the second device in the method embodiment in FIG. 6. To avoid repetition, details are not described herein again.

An embodiment of this application further provides a readable storage medium, where a program or instructions are stored in the readable storage medium. When the program or instructions are executed by a processor, the processes of the foregoing embodiments of the discontinuous transmission method or the signal sending and processing method can be implemented, with same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network device to implement the processes of the foregoing embodiment of the discontinuous transmission method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A discontinuous transmission method, comprising:

sending, by a first device, a first signal based on a target discontinuous transmission DTX configuration, wherein the first signal is used for energy collection by a second device;

wherein the target DTX configuration comprises a value of the following parameter:

DTX inactivity timer;

wherein the step of sending, by a first device, a first signal based on a target discontinuous transmission DTX configuration comprises:

receiving, by the first device, a second signal sent by the second device;

starting, by the first device, the DTX inactivity timer in response to the first device receiving the second signal sent by the second device;

sending the first signal based on a first DTX cycle in response to the DTX inactivity timer not expiring; and sending the first signal based on a second DTX cycle in response to the DTX inactivity timer expiring.

2. The method according to claim 1, wherein the target DTX configuration further comprises values of the following parameters:

long DTX cycle and time offset;

DTX on-duration; or short DTX cycle timer.

3. The method according to claim 1, wherein the target DTX configuration comprises a value of at least one of the following parameters: long DTX cycle or short DTX cycle; the long DTX cycle is M times the short DTX cycle, and M is an integer greater than 1;

wherein the long DTX cycle or the short DTX cycle comprises a DTX on-duration and a DTX off time, and the step of sending, by a first device, a first signal based on a target discontinuous transmission DTX configuration comprises:

sending, by the first device, the first signal during the DTX on-duration.

4. The method according to claim 1, wherein before the step of sending, by a first device, a first signal based on a target discontinuous transmission DTX configuration, the method further comprises:

receiving, by the first device, first indication information sent by the second device or a network device; wherein the first indication information is used to indicate the target DTX configuration; or the first indication information is used to indicate one of at least two DTX configurations being the target DTX configuration.

5. The method according to claim 1, wherein after the starting, by the first device, the DTX inactivity timer in a case that the first device receives a second signal sent by the second device, the method further comprises:

in a case that the first device receives again, before the DTX inactivity timer expires, a second signal sent by the second device, restarting, by the first device, the DTX inactivity timer.

6. The method according to claim 1, wherein the target DTX configuration comprises a value of at least one of the following parameters: long DTX cycle or short DTX cycle;

wherein the step of sending, by a first device, a first signal based on a target discontinuous transmission DTX configuration comprises:

in a case that a DTX inactivity timer of the long DTX cycle of the first device is started and expires, sending, by the first device, the first signal based on the short DTX cycle; and in a case that DTX inactivity timers of N short DTX cycles are not started in the N consecutive short DTX cycles, sending, by the first device, the first signal based on the long DTX cycle, wherein N is a positive integer.

7. The method according to claim 1, wherein the target DTX configuration further comprises values of the following parameters:

DTX cycle; or time position at which the first signal needs to be sent in the DTX cycle.

8. The method according to claim 7, wherein before the step of sending, by a first device, a first signal based on a target discontinuous transmission DTX configuration, the method further comprises at least one of the following:

determining, by the first device, the target DTX configuration based on received second indication information sent by the second device or a network device;

in a case that a second signal sent by the second device is received, determining, by the first device, a first preset DTX configuration as the target DTX configuration; and in a case that the second signal sent by the second device is not received within a preset time period, determining, by the first device, a second preset DTX configuration as the target DTX configuration.

9. The method according to claim 8, wherein in the case that the second signal sent by the second device is received, the first preset DTX configuration is determined as the target DTX configuration at a target time point, and the target time point is N time units after the second signal is received.

10. A first communications device, comprising a memory, a processor, and a program or instructions stored in the memory and ran on the processor; and when the program or the instructions are executed by the processor, the following steps are implemented:

sending a first signal based on a target discontinuous transmission DTX configuration, wherein the first signal is used for energy collection by a second device;

wherein the target DTX configuration comprises a value of the following parameter:

DTX inactivity timer;

wherein the step of sending, by a first device, a first signal based on a target discontinuous transmission DTX configuration comprises:

receiving, by the first device, a second signal sent by the second device;

starting, by the first device, the DTX inactivity timer in response to the first device receiving the second signal sent by the second device;

sending the first signal based on a first DTX cycle in response to the DTX inactivity timer not expiring; and sending the first signal based on a second DTX cycle in response to the DTX inactivity timer expiring.

11. The first communications device according to claim 10, wherein the target DTX configuration comprises a value of at least one of the following parameters: long DTX cycle or short DTX cycle; the long DTX cycle is M times the short DTX cycle, and M is an integer greater than 1;

wherein the long DTX cycle or the short DTX cycle comprises a DTX on-duration and a DTX off time, and the step of sending, by a first device, a first signal based on a target discontinuous transmission DTX configuration comprises:

sending, by the first device, the first signal during the DTX on-duration.

12. The first communications device according to claim 10, wherein the program or the instructions are executed by the processor, the following steps are further implemented:

before the step of sending, by a first device, a first signal based on a target discontinuous transmission DTX configuration, the method further comprises:

receiving, by the first device, first indication information sent by the second device or a network device; wherein the first indication information is used to indicate the target DTX configuration; or the first indication information is used to indicate one of at least two DTX configurations being the target DTX configuration.

13. The first communications device according to claim 10, wherein the program or the instructions are executed by the processor, the following steps are further implemented:

wherein after the starting, by the first device, the DTX inactivity timer in a case that the first device receives a second signal sent by the second device, the method further comprises:

in a case that the first device receives again, before the DTX inactivity timer expires, a second signal sent by the second device, restarting, by the first device, the DTX inactivity timer.

14. The first communications device according to claim 10, wherein the target DTX configuration comprises a value of at least one of the following parameters: long DTX cycle or short DTX cycle;

wherein the step of sending, by a first device, a first signal based on a target discontinuous transmission DTX configuration comprises:

in a case that a DTX inactivity timer of the long DTX cycle of the first device is started and expires, sending, by the first device, the first signal based on the short DTX cycle; and in a case that DTX inactivity timers of N short DTX cycles are not started in the N consecutive short DTX cycles, sending, by the first device, the first signal based on the long DTX cycle, wherein N is a positive integer.

15. The first communications device according to claim 10, wherein the target DTX configuration further comprises values of the following parameters:

DTX cycle; or time position at which the first signal needs to be sent in the DTX cycle.

16. The first communications device according to claim 15, wherein the program or the instructions are executed by the processor, the following steps are further implemented:

wherein before the step of sending, by a first device, a first signal based on a target discontinuous transmission DTX configuration, the method further comprises at least one of the following:

determining, by the first device, the target DTX configuration based on received second indication information sent by the second device or a network device;

in a case that a second signal sent by the second device is received, determining, by the first device, a first preset DTX configuration as the target DTX configuration; and in a case that the second signal sent by the second device is not received within a preset time period, determining, by the first device, a second preset DTX configuration as the target DTX configuration.

17. The first communications device according to claim 16, wherein in the case that the second signal sent by the second device is received, the first preset DTX configuration is determined as the target DTX configuration at a target time point, and the target time point is N time units after the second signal is received.

18. The first communications device according to claim 10, wherein the target DTX configuration further comprises values of the following parameters:

long DTX cycle and time offset;

DTX on-duration; or short DTX cycle timer.

* * * * *